United States Patent [19]

Kozawa et al.

[11] Patent Number: 4,667,524
[45] Date of Patent: May 26, 1987

[54] CARRIAGE DRIVING MACHANISM

[76] Inventors: Kazuyoshi Kozawa, 2-3-31 Nakazato; Takamichi Fuke, 2-3 Sakae-cho, both of Furukawa-shi, Miyagi-ken, Japan

[21] Appl. No.: 738,095
[22] Filed: May 24, 1985
[30] Foreign Application Priority Data
  May 25, 1984 [JP] Japan .................................. 59-75738
[51] Int. Cl.⁴ ............................................ F16H 25/20
[52] U.S. Cl. .................. 74/89.15; 74/424.8 R
[58] Field of Search ........................ 74/89.15, 424.8 R; 360/104, 105, 106

[56] References Cited
U.S. PATENT DOCUMENTS

| | | | |
|---|---|---|---|
| 2,233,915 | 3/1941 | Conrad | 74/424.8 R |
| 3,475,705 | 10/1969 | Lindemann | 74/89.15 |
| 3,654,816 | 4/1972 | Beery et al. | 74/424.8 R |
| 4,041,793 | 8/1977 | Repay et al. | 74/424.8 R |
| 4,274,294 | 6/1981 | Siryj et al. | 74/89.15 |
| 4,333,116 | 6/1982 | Schoettle et al. | 360/106 |
| 4,528,607 | 7/1985 | Thompson | 74/89.15 |

FOREIGN PATENT DOCUMENTS 58-200848 11/1983 Japan .................................. 74/89.15

Primary Examiner—Lawrence J. Staab

[57] ABSTRACT

Herein disclosed is a carriage driving mechanism for use with a floppy disc drive or the like to drive a carriage carrying a magnetic head so that the magnetic head may be driven to a desired track on the floppy disc to record or read out data in or from a floppy disc. The carriage driving mechanism comprises: a drive shaft having a helical guide groove in its outer circumference; a prime mover for turning the drive shaft; a guide shaft extending in parallel with the drive shaft; a carriage mounted slidably on the guide shaft; and a follower carried on the carriage and engaging with the guide groove of the drive shaft. A spring member is carried on the carriage to mount the follower thereon so that the follower may have its tip guided elastically by the guide groove of the drive shaft.

3 Claims, 8 Drawing Figures

CARRIAGE DRIVING MACHANISM

BACKGROUND OF THE INVENTION

1. Field of the Invention

The present invention relates to a mechanism for driving a carriage and, more particularly, to means for mounting a follower which is carried on the carriage for engaging with the guide groove of a drive shaft.

2. Description of the Prior Art

For example, a floppy disc drive is equipped with a carriage for driving a magnetic head, which is made operative to record data in a floppy disc and to read out the data from the floppy disc, to a desired track on the floppy disc in accordance with the operation of the operator.

Before entering into detailed description of the invention, specific review will be made upon the relevant prior art with reference to the accompanying drawings. FIGS. 5 and 6 are schematic views showing the carriage driving mechanism of the above-specified type known in the prior art.

In these Figures: reference numeral 1 indicates a drive shaft which is formed with a helical guide groove 1a in its outer circumference; numerals 2 and 3 indicate bearings which bear the drive shaft 1; numeral 4 indicates a motor for driving the drive shaft 1; numeral 5 indicates a gear train for transmitting the driving force of that motor 4 to the aforementioned drive shaft 1; numeral 6 indicates a carriage; numeral 7 indicates a magnetic head which is carried on the carriage 6; numeral 8 indicates guide shafts for guiding the carriage 6 in a direction parallel to the aforementioned drive shaft 1; and numeral 9 indicates a follower which is carried on the aforementioned carriage 6 for engaging with the guide groove 1a of the aforementioned drive shaft 1.

The drive mechanism thus constructed alternately switches power supply to the magnetization phases of the motor 4 to intermittently turn the drive shaft 1 thereby to intermittently drive the carriage through the follower 9 in the directions of arrows A and B along the guide shafts 8 so that it can carry the magnetic head 7 to a predetermined recording track of the floppy disc.

As the drive shaft to be used in the drive mechanism of this kind, the present applicant has previously devised the drive shaft, which has its helical guide groove 1a formed at a predetermined angle of rotation with portions 1b having a zero angle of lead $\theta$, as shown in FIGS. 7 and 8, and described in utility model registration (i.e., Japanese Utility Model Application No. 57-187126).

The carriage driving mechanism using the above drive shaft 1 drives the carriage 6, i.e., the magnetic head 7 to the predetermined position, even if the angle of lead $\theta$ of the guide groove 1a is more or less dispersed or if a small-control error is caused in the revolutions of the motor 4, so that it can prevent in advance the erroneous tracking.

In the driving mechanism of this kind according to the prior art, however, since the follower 9 is fixedly mounted on the carriage 6, the following disadvantages are caused in case the drive shaft 1 shown in FIGS. 7 and 8 is used:

(1) Since the guide groove 1a is not formed into a smooth circumference, as is apparent from FIGS. 6 and 7, the contacting pressure between the follower 9 and the guide groove 1a fluctuates in accordance with the revolutions of the drive shaft 1 to obstruct the smooth sliding of the follower 9 in the guide groove 1a. More specifically, if the follower is set in advance in a position to abut against the bottom 1c of the guide groove 1a, the contacting pressure between the drive shaft 1 and the follower 9 becomes excessive when the drive shaft 1 revolves to a position in which the follower 9 abuts against the transition 1d of the guide groove 1a, so that the frictional force makes the operation of the carriage 6 lack smoothness. Moreover the drive shaft 1 and the follower 9 become liable to be worn and not only degrade remarkably the durability of the carriage driving mechanism but also allow fine dust particles from the drive shaft 1 and the follower 9 to adversely affect the floppy disc.

(2) In order to smooth the sliding movement on the guide shafts 8, moreover, the carriage 6 is formed, as shown in FIG. 6, with a guide shaft receiving hole 6a having a larger diameter than that of the guide shaft 8. As a result, if the contacting pressure between the drive shaft 1 and the follower 9 fluctuates in accordance with the revolutions of the drive shaft, the carriage 6 becomes liable to pitch thereby to invite disadvantages that noises are made and that the durability is degraded.

(3) If the follower 9 is set in advance in the position to abut against the transition 1d of the guide groove 1a so as to avoid the excessive contacting pressure between the drive shaft 1 and the follower 9, a gap is established inbetween the bottom 1c of the guide groove 1a so that a backlash is caused between the guide groove 1a of the drive shaft 1 and the follower 9, in case the revolving direction of the drive shaft 1 is reversed, thereby to make it impossible to drive the carriage 6 to an accurate position.

SUMMARY OF THE INVENTION

The present invention contemplates to eliminate those disadvantages concomitant with the carriage driving mechanism of the prior art and has an object to provide a carriage driving mechanism which is excellent in silence and durability and capable of driving the carriage accurately to a desired position.

In order to achieve the above-specified object, according to the present invention, the carriage is equipped with a spring member supporting a follower which is brought into engagement with the guide groove of the drive shaft.

According to a major feature of the present invention, there is provided a carriage driving mechanism comprising: a drive shaft having a helical guide groove in its outer circumference; a prime mover for turning said drive shaft; a guide shaft extending in parallel with said drive shaft; a carriage mounted slidably on said guide shaft; and a follower carried on said carriage and engaging with the guide groove of said drive shaft, wherein the improvement comprises a spring member carried on said carriage and mounting said follower thereon.

BRIEF DESCRIPTION OF THE DRAWINGS

Other objects, features and advantages of the present invention will become apparent from the following description taken in conjucntion with one embodiment thereof with reference to the accompanying drawings, in which.

DESCRIPTION OF THE PREFERRED EMBODIMENT

The present invention will be described in the following in connection with one embodiment thereof with reference to the accompanying drawings.

Figure 1:
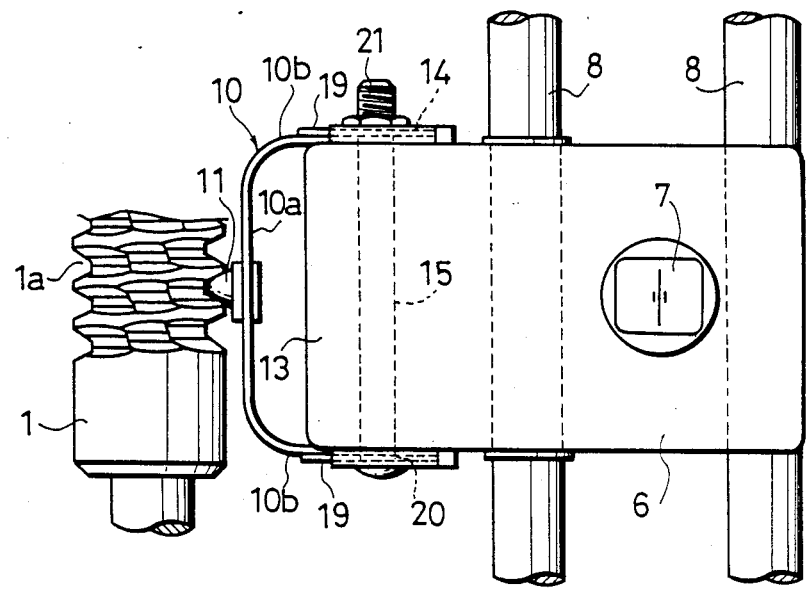
FIG. 1 is a top plan view showing a carriage driving mechanism according to the embodiment of the present invention.
Figure 2:
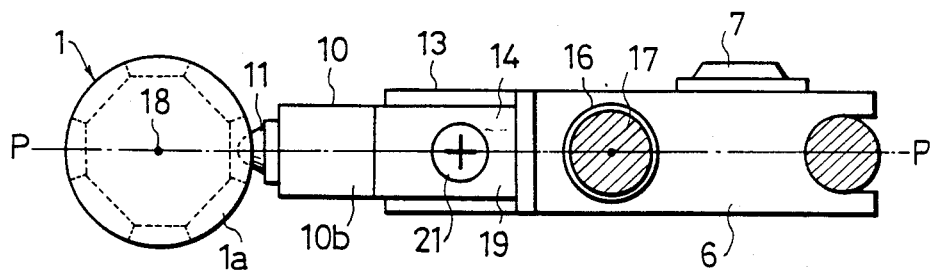
FIG. 2 is a sectional side elevation showing the carriage driving mechanism of the present invention.
Figure 3:
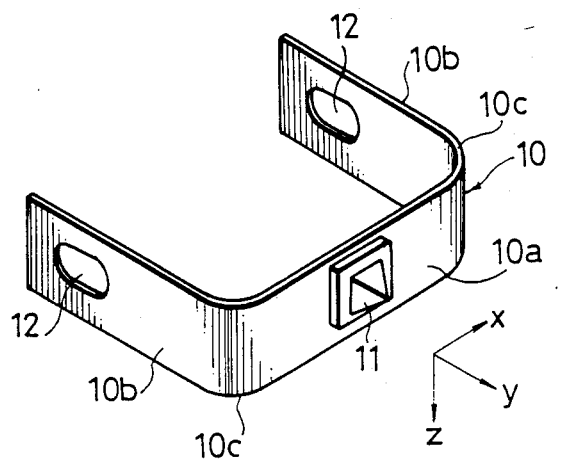
FIG. 3 is a perspective view showing a spring member to be used with the carriage driving mechanism of the present invention.
Figure 5:
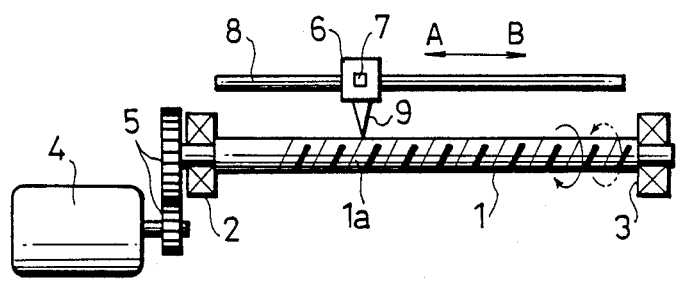
FIG. 5 is a schematic top plan view showing the carriage driving mechanism of the prior art.
Figure 6:
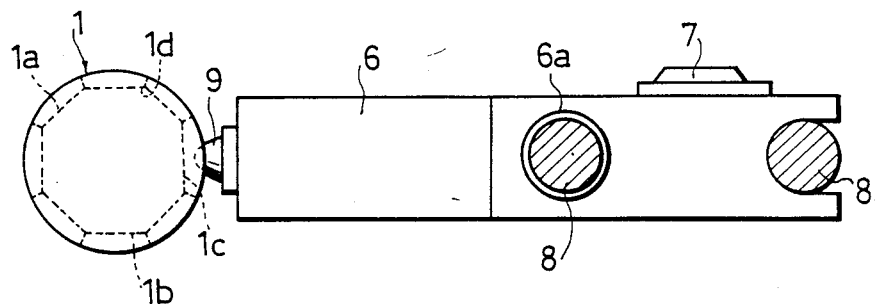
FIG. 6 is a sectional side elevation showing the carriage driving mechanism of the prior art.
Figure 7:
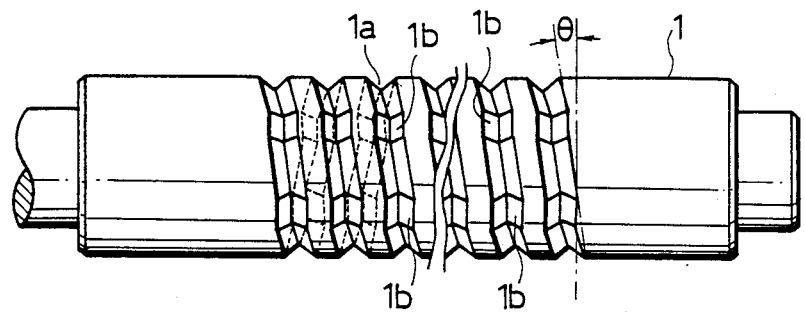
FIG. 7 is a partially cut-away front elevation showing a drive shaft to be used with the carriage driving mechanism of the prior art in an enlarged scale.
Figure 8:
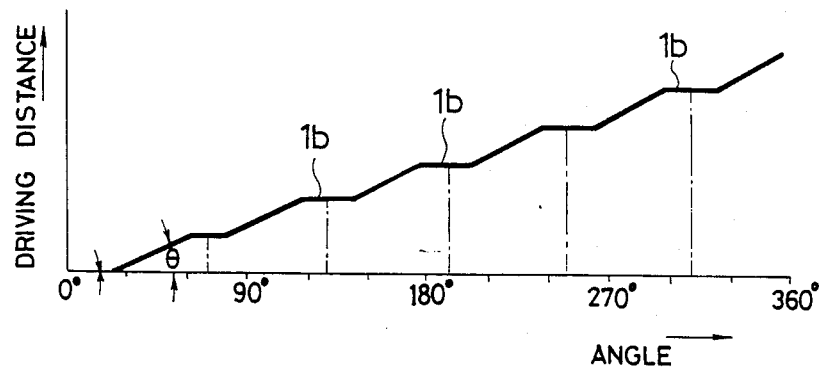
FIG. 8 is a diagram for explaining the angle of lead of the guide groove, which is formed in the drive shaft of FIG. 7.

FIG. 1 is a top plan view showing the carriage driving mechanism according to the present invention; FIG. 2 is a sectional view of the carriage driving mechanism taken from the side; and FIG. 3 is a perspective view showing a spring member to be used with the carriage driving mechanism according to the present invention. Parts similar to those shown in FIGS. 5 and 6 are indicated by the same reference numerals.

In FIGS. 1 to 3, reference numeral 10 a spring member which is formed generally into the shape of letter "C" by bending in a common direction the two end portions of a thin leaf spring having excellent elasticity. A follower 11 is fixed to the outer side of the center of a central portion 10a, and the remaining two mounting plate portions 10b are formed at symmetrical positions with bolt holes 12 into which a later-described bolt is inserted. The bent corners 10c, which merge into the central plate portion 10a and the mounting plate portions 10b constructing the aforementioned spring member 10, are shaped into an arc having a large curvature. As a result, in case the spring member 10 is attached to the carriage 6, the central plate portion 10a is liable to be elastically deformed by the force in the direction of y—y of FIG. 3, but the bent portions 10c are reluctant to be elastically deformed by the force in the direction of x—x of FIG. 3. Since the spring member 10 is made of a leaf spring, incidentally, it is highly rigid against the widthwise force so that it is reluctant to be elastically deformed by the force in the direction of z—z of FIG. 3. Indicated at numeral 13 is a spring member setting portion which is formed at such a portion of the carriage 6 as to face the drive shaft 1. The carriage 6 is further formed at both the sides of the setting portion 13 with rotation stoppers 14 which are made so wide and deep as to snugly fit the mounting plate portions 10b of the spring member 10. Those rotation stoppers 14 are formed with bolt receiving holes 15 which extend to both the ends of the spring member setting portions 13. The rotation stoppers 14 are recessed, as better seen from FIG. 2, in such a positional relationship that the follower 11 has its tip positioned on the axis p—p joining the axis 17 of the guide shaft receiving hole 16 of the carriage 6 and the axis 18 of the drive shaft 1. Indicated at numeral 19 are reinforcing plates which are formed of such elastic thin plates which are wide enough to be fitted in the aforementioned rotation stoppers 14 and shorter than the mounting plate portions 10b of the aforementioned spring member 10. The reinforcing plates 19 are formed with bolt holes 20 at their predetermined positions. As shown in FIGS. 1 and 2, the spring member 10 is fastened integrally to the carriage 6 by holding the mounting plate members 10b in the rotation stoppers 14, which are formed at both the ends of the spring member setting portions 13 of the carriage 6, by overlaying the reinforcing plates 19 on the upper sides of the mounting plate portions 10b, and by using a fastening bolt 21 extending through the bolt holes 12, 15 and 20.

The carriage driving mechanism of the present invention is set, as shown in FIGS. 1 and 2, by elastically fitting the follower 11 in the guide groove 1a of the drive shaft 1 so that the drive shaft 1 and the carriage 6 may contact with each other under a constant pressure through the follower 11.

In the carriage driving mechanism thus far described according to the embodiment, like the driving mechanism of the prior art, when the drive shaft 1 is turned forward or backward, the follower 11 fitted in the guide groove 1a of the drive shaft 1 is driven by the guide groove 1a so that the carriage 6 is moved to the right or left along the guide shaft 8 through the spring member 10. Since, in this case, the follower 11 is held in elastic contact with the guide groove 1a of the drive shaft 1 by the spring member 10, the contacting pressure between the drive shaft 1 and the follower 11 is kept substantially uniform, even if the guide groove 1a has the transition 1d with respect to the angle of lead $\theta$, so that the carriage 6 hardly vibrate. As a result that the follower 11 and the drive shaft 1 are held in elastic contact with each other by the spring member 10, moreover, they contact uniformly at all times so that no backlash is caused between the drive shaft 1 and the follower 11, even if the revolving direction of the drive shaft 1 is reversed. Thus, the carriage 6 can be driven accurately to a desired position. Since the pushing pressure between the drive shaft 1 and the follower 11 by the elastic force of the spring member 10 is relatively weak, moreover, the operation of the carriage 6 is preventing from becoming short of smoothness, and the drive shaft 1 and the follower 11 are prevented from being worn to raise practical problems.

Figure 4:
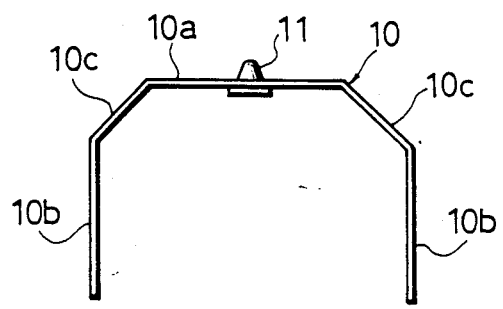
FIG. 4 is a top plan view showing a modification of the spring member to be used with the carriage driving mechanism of the present invention.

In the foregoing embodiment, incidentally, the description has been directed to the case in which the spring member is bent into the shape of letter "C". Despite of this fact, however, the gist of the present invention resides in that the follower is fixed to the spring member carried on the carriage. Therefore, the shape of the spring member should not be limited to that of the aforementioned embodiment but may be arbitrary. As shown in FIG. 4, for example, the spring member 10 can be folded into the sloped portions 10c between the central plate portion 10a and the mounting plate portions 10b.

As has been described hereinbefore, the carriage driving mechanism of the present invention is constructed such that the follower is set at the central position of the carriage by means of the spring member. As a result, when the follower is forced into contact with the drive shaft, the follower is fixed on the guide shaft by the elastic force of the spring member so that the carriage hardly vibrates, as different from the prior art. Since the follower contacts elastically with the guide groove of the drive shaft, moreover, the contacting pressure between the drive shaft and the follower is held at a substantially uniform level, even if the guide groove is formed with the groove portions, so that the carriage hardly vibrates. As a result that the follower and the drive shaft are held in elastic contact with each other by the action of the spring member, still moreover, they contact uniformly at all times so that no backlash is caused between the drive shaft and the follower even if the revolving direction of the drive shaft is reversed. Thus, the carriage can be driven accurately to a desired position.

What is claimed is:

1. In a carriage driving mechanism comprising a drive shaft having a helical guide groove on its outer circumference, a prime mover for turning said drive shaft, a guide shaft extending in parallel with said drive shaft, a carriage mounted slidably on said guide shaft, and a follower carried on a portion of said carriage and engaged in the guide groove of said drive shaft, the improvement comprising a leaf spring mounting said follower on said carriage portion wherein said leaf spring has a central plate portion parallel to said shaft axis to which said follower is fixed, and two mounting plate portions extending from both ends of said central plate portion in a direction perpendicular to said drive shaft in a plane defined by said drive shaft and guide shaft, whereby said follower is mounted to said carriage portion such that it can be elastically deformed in said perpendicular direction but not in a driving direction of said drive shaft or in a direction normal to said plane defined by said drive shaft.

2. A carriage driving mechanism according to claim 1, wherein said carriage portion has two side mounting surfaces against which said mounting plate portions are supported, and further comprising reinforcing means mounted so as to abut against an outer side of each mounting plate portion on each of said side mounting surfaces for preventing said leaf spring from being elastically deformed in the driving direction of said carriage.

3. A carriage driving mechanism according to claim 1, further comprising rotation stopping means for mounting said mounting plate portions of said leaf spring to said carriage portion such that it is prevented from any rotation.

* * * * *